United States Patent [19]
Van Mill et al.

[11] Patent Number: 5,322,328
[45] Date of Patent: Jun. 21, 1994

[54] SUSPENSION SYSTEM FOR HEAVY-DUTY VEHICLES

[75] Inventors: Michael D. Van Mill, Shell Rock; David A. Steimel, Waterloo, both of Iowa

[73] Assignee: Unverferth Manufacturing Co., Inc., Kalida, Ohio

[21] Appl. No.: 997,188

[22] Filed: Dec. 28, 1992

[51] Int. Cl.⁵ .............................. B62D 1/02
[52] U.S. Cl. .................. 280/789; 280/81.6; 280/676; 296/182
[58] Field of Search ............... 180/22, 24.02, 24.04, 180/290; 280/789, 790, 682, 676, 81.6, 423.1; 296/182

[56] References Cited
U.S. PATENT DOCUMENTS 3,088,774  5/1963  Bernstein et al. ............... 280/789
3,249,169  5/1966  Cheak ........................... 280/789

Primary Examiner—Mitchell J. Hill
Attorney, Agent, or Firm—Henderson & Sturm

[57] ABSTRACT

A suspension system for a cart having a pair of longitudinally aligned, oscillating wheel support units pivotally mounted fore and aft within a frame assembly on each side of the cart, a pair of longitudinally aligned wheels mounted on each support unit, the frame assemblies pivotally mounted in transverse alignment centrally of the cart for movement with the wheel support units in a vertical plane, all three pivotal mountings on each side of the part having horizontal axes disposed transversely of the cart, with the load of the cart distributed on each side to a quartet of wheels and with each pair of wheel support units oscillatable independently of each other and independent of the pivotal movement of their respective frame assembly.

11 Claims, 4 Drawing Sheets

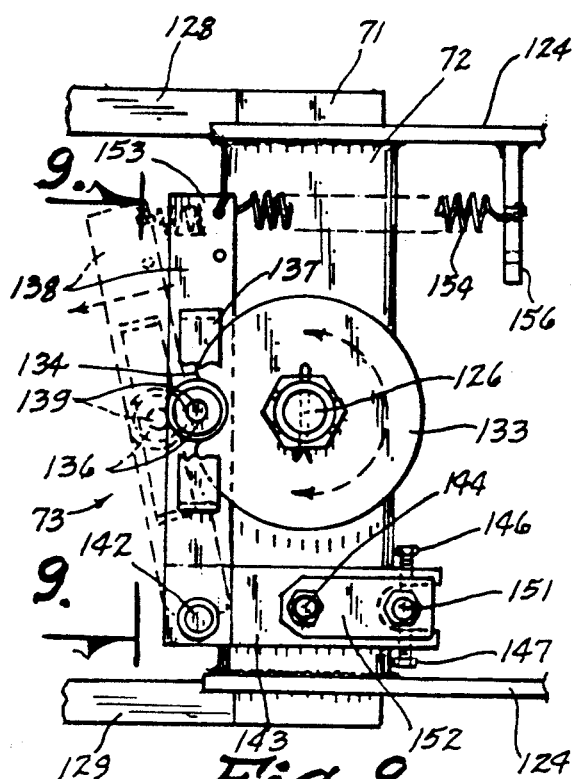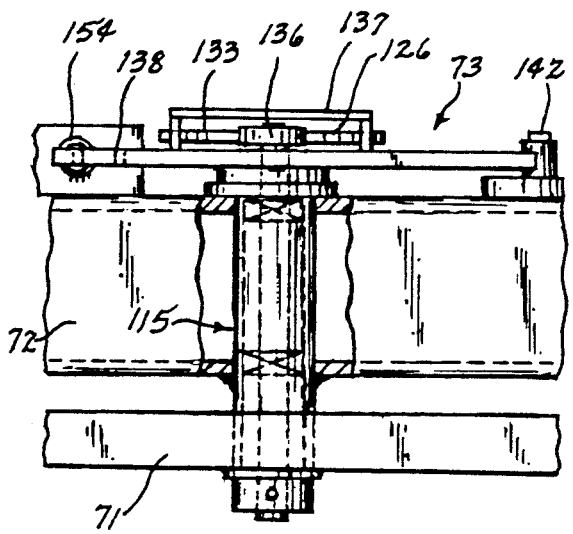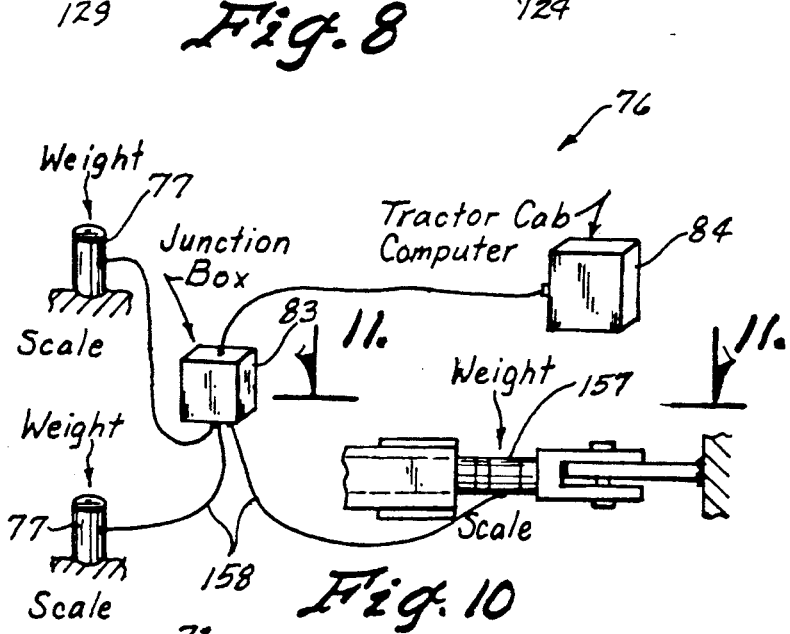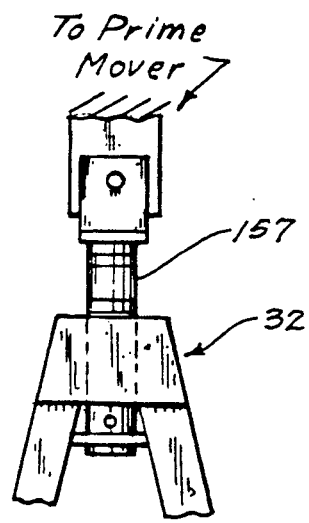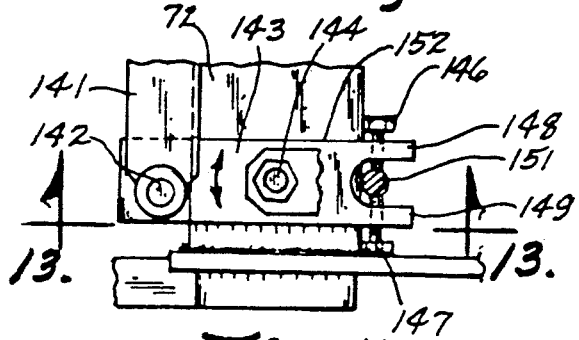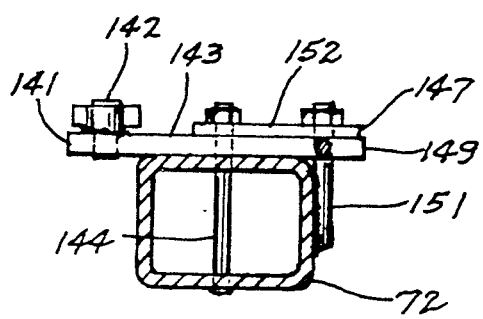

SUSPENSION SYSTEM FOR HEAVY-DUTY VEHICLES

TECHNICAL FIELD

This invention relates to a suspension system for heavy duty vehicles, such as grain carts, and more particularly to a plurality of multi-wheel bogies longitudinally arranged for independent action on each side of the cart.

BACKGROUND OF THE INVENTION

All vehicles from highway trucks to farm wagons have always had the dual problems of suspension systems which are capable of carrying very heavy loads over almost any terrain, and which systems are capable of uniformly distributing the load on the wagon frame to the vehicle supporting means, whether that means be conventional wheels or track systems.

For farm operators, the problem is exacerbated by the need to eliminate as much as practicable the forming of deep ruts in fields used for grain growth and harvesting. Such ruts are usually formed by o combines and heavy grain wagons, in wet and muddy fields. If fields remain deeply rutted into the following spring, crop planting is made tougher because the planter will have to adjust to widely varying terrain in the same field, and soil compaction problems arise from such ruts that could retard plant growth. Further, farmers adopting conservation tillage practices are forced, with deep ruts, to use a light disk or other shallow implement in the following spring to move soil into the ruts while keeping the previous year's residue on the surface.

Many contemporary vehicles do not have suspension systems that will permit the vehicle to maintain a reasonably level attitude when one of the supporting wheels encounters an obstruction or depression. The result is that the vehicle frame and the supporting load are tilted to an undesirable angular position. Additionally, contemporary suspension systems do not distribute the load uniformly creating increasing "pressure peaks" from front to back, as seen for example in tracked vehicles. Further, the castering capability of some suspension systems of today utilizing ground engaging wheels is inadequate to eliminate "herming" which can result from dragging a tracked grain cart or an improperly castered bogie wheel unit through a tight turn.

DISCLOSURE OF THE INVENTION

One of the objects of the invention is to eliminate the above mentioned disadvantages by providing a suspension system for a vehicle such as a grain cart or the like having a frame with an oscillating suspension system on each side of the vehicle, each suspension system identical and comprising an elongated, box frame assembly pivotally mounted on an outrigger unit secured to and extended laterally from the cart frame. The box frame pivotal mountings are transversely aligned, but not interconnected—being independent relative to the cart frame and adjacent the longitudinal midpoint of the cart frame. At each fore and aft end of a box frame, a bogie wheel unit is pivotally mounted, such that the pair of bogie wheel units are longitudinally aligned and are independently mounted relative to each other. All pivotal mountings are transversely disposed on a horizontal axis, with the box frame and both bogie wheel units movable within a common vertical plane such that three independent and separate pivotal movements are provided.

Each bogie wheel unit comprises a framework the inner end of which is disposed inwardly of the box frame, the outer end of which is disposed outwardly of the box frame, and with a longitudinally spaced and aligned pair of ground engaging wheels rotatably mounted at both the inner and outer ends. Each outer mounted wheel has a full 360° caster mounting, with the wheel rotatable outwardly of the box frame from a position trailing the framework relative to the direction of travel of the cart to a position 180° rotated therefrom upon reversal of the cart direction. A caster locking mechanism is provided to maintain the outer wheel in a normal trailing position by a spring biased unit.

The outrigger unit may be either secured to the cart frame in a non-movable condition or it may be pivotally mounted thereto for relative movement in a transverse vertical plane, whereby a load sensing apparatus may be interposed between the cart frame and each outrigger unit, and also at the tongue of the cart if desirable, for ascertaining the weight of a load of grain or other material carried by the cart.

A major object of this invention is to provide a novel suspension system for a load carrying vehicle utilizing a plurality of multiple bogie wheel units for distributing the load uniformly to multiple ground engaging wheels thereby lessening the load at each wheel from that conventionally provided.

Another object of this invention is to provide a novel vehicle suspension system wherein a pair of multi-bogie wheel units are mounted on each side of the vehicle in longitudinal alignment in connection with a single axle frame pivotally mounted to the vehicle, with each wheel unit mounted independently of the other for pivotal movement within a vertical plane to enable oscillating movement of one wheel unit over uneven terrain without affecting the other wheel unit.

Yet another object of this invention is to provide such a novel vehicle suspension system with each axle frame pivotally movable within a vertical plane common with the bogie wheel unit vertical plane of movement whereby to ensure uniformity of loads on all wheels, regardless of the terrain.

A further object of this invention is to provide such a novel vehicle suspension system with an improved castering structure to ensure prompt and even castering of each outer wheel fore and aft of each axle frame to prevent dragging and/or skidding of either outer caster wheel during reversal of direction of the vehicle; and further to bias each outer wheel toward a correct, longitudinally aligned position during forward or rearward normal movement of the vehicle.

Still another object of this invention is to provide such a novel vehicle suspension system wherein each axle frame at each side of the vehicle is not only pivotal within a vertical plane longitudinal the vehicle, but is also pivotally mounted to the vehicle within a transverse, vertical plane whereby a load sensing assembly may be utilized on each side of the vehicle to provide an operator-viewable display of the weight of a load carried by the vehicle.

The accompanying drawings show a preferred embodiment of the present invention, it being intended that the following description be interpreted as illustrative and not in a limiting sense.

BRIEF DESCRIPTION OF THE DRAWINGS

These and other attributes of the invention will become more clear upon making a thorough review and study of the following description of a preferred embodiment, particularly when reviewed in conjunction with the drawings, wherein:

FIG. 8 is an enlarged detail view of the castor locking mechanism as taken along the line 8—8 in FIG. 4;

FIG. 9 is a vertical elevational view as taken along the line 9—9 in FIG. 8, with certain parts broken away for clarity of illustration;

FIG. 10 is a schematic of the load sensing apparatus of this invention;

FIG. 11 is a fragmentary detail plan view of a portion of the vehicle tongue unit;

FIG. 12 is a detail view of FIG. 8, with certain parts broken away for clarity of illustration; and FIG. 13 is a vertical sectional view taken along the line 13—13 in FIG. 12.

BEST MODE FOR CARRYING OUT THE DRAWINGS

Figure 1:
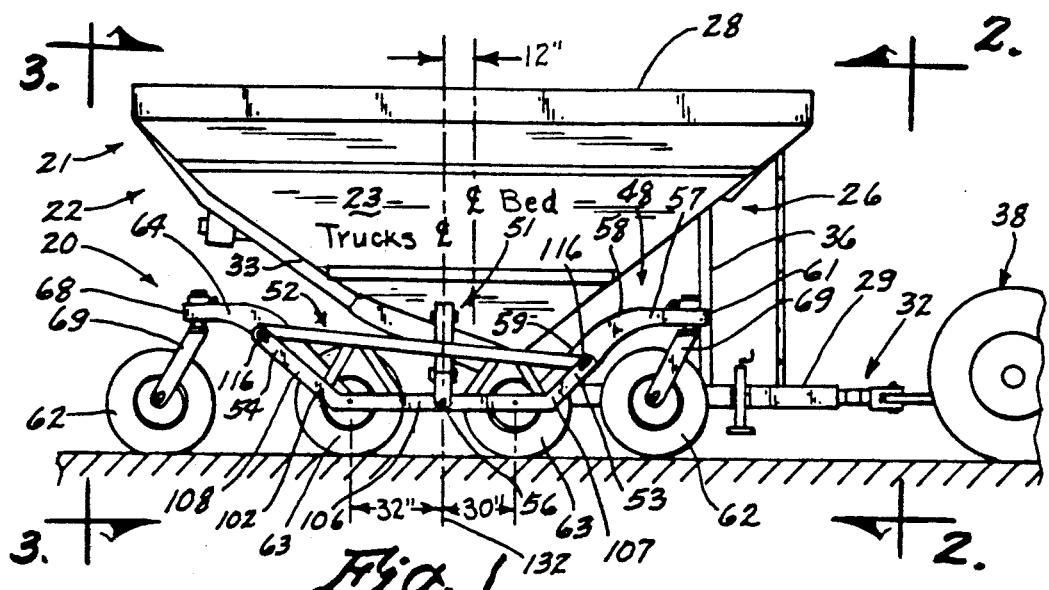
FIG. 1 is a side elevational view of the vehicle and one side of the suspension system of this invention.

Referring now to the drawings, the suspension system of this invention is indicated generally at (20) in FIG. 1, and supports any conventional vehicle for heavy duty load carrying, such as a grain cart (21) having a frame indicated generally at (22) with sidewalls (23) and (24).

Figure 3:
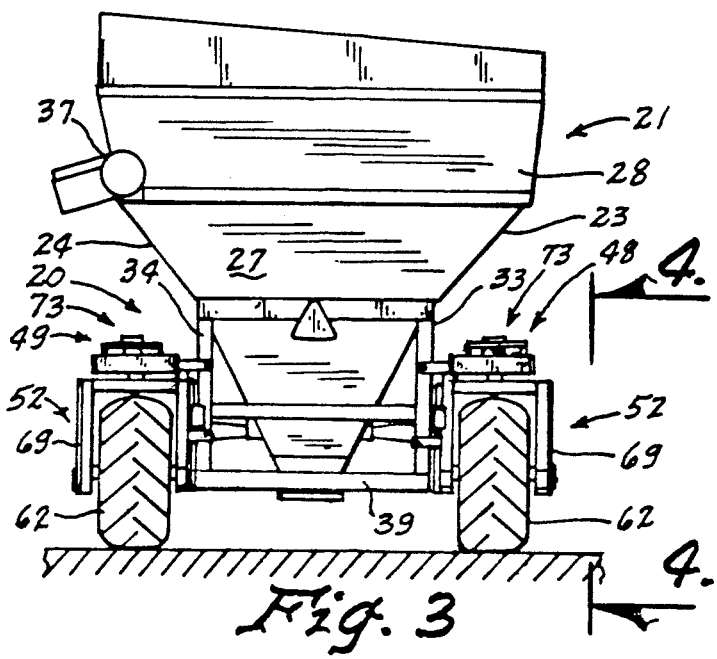
FIG. 3 is a rear elevational view as taken along the lines 3—3 in FIG. 1.
Figure 4:
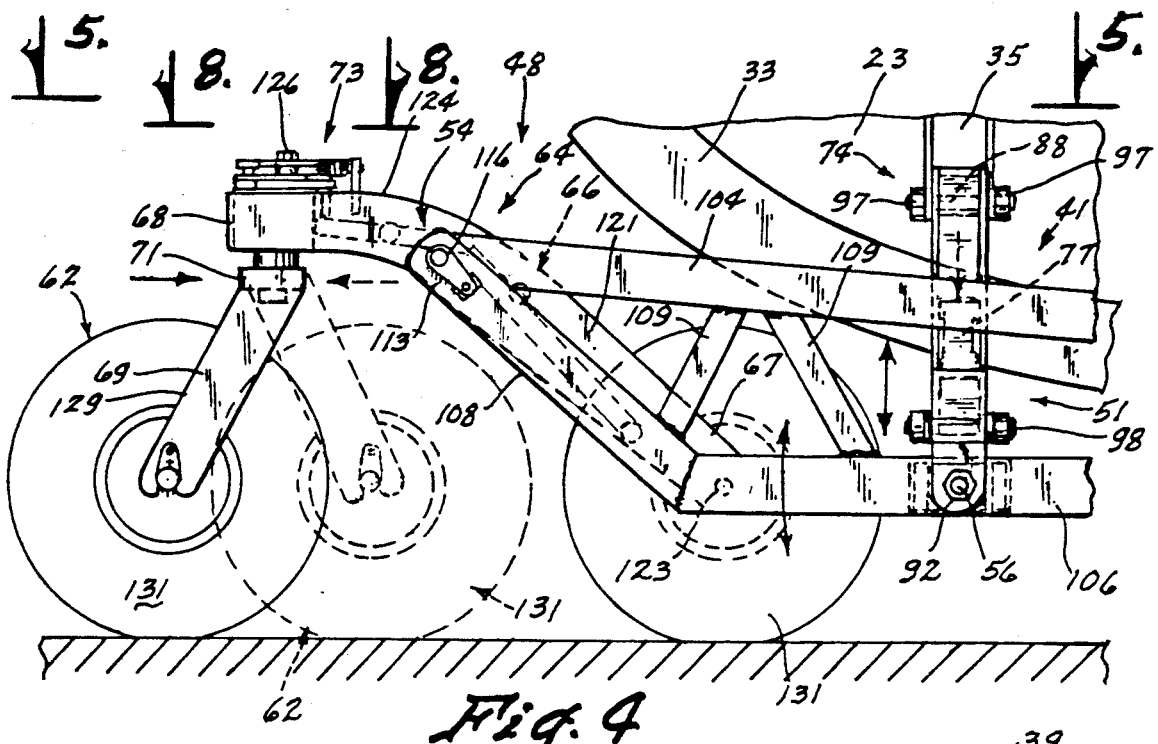
FIG. 4 is an enlarged detail view of FIG. 1, showing reversed positions of an outer bogie wheel by the use of dashed lines.
Figure 5:
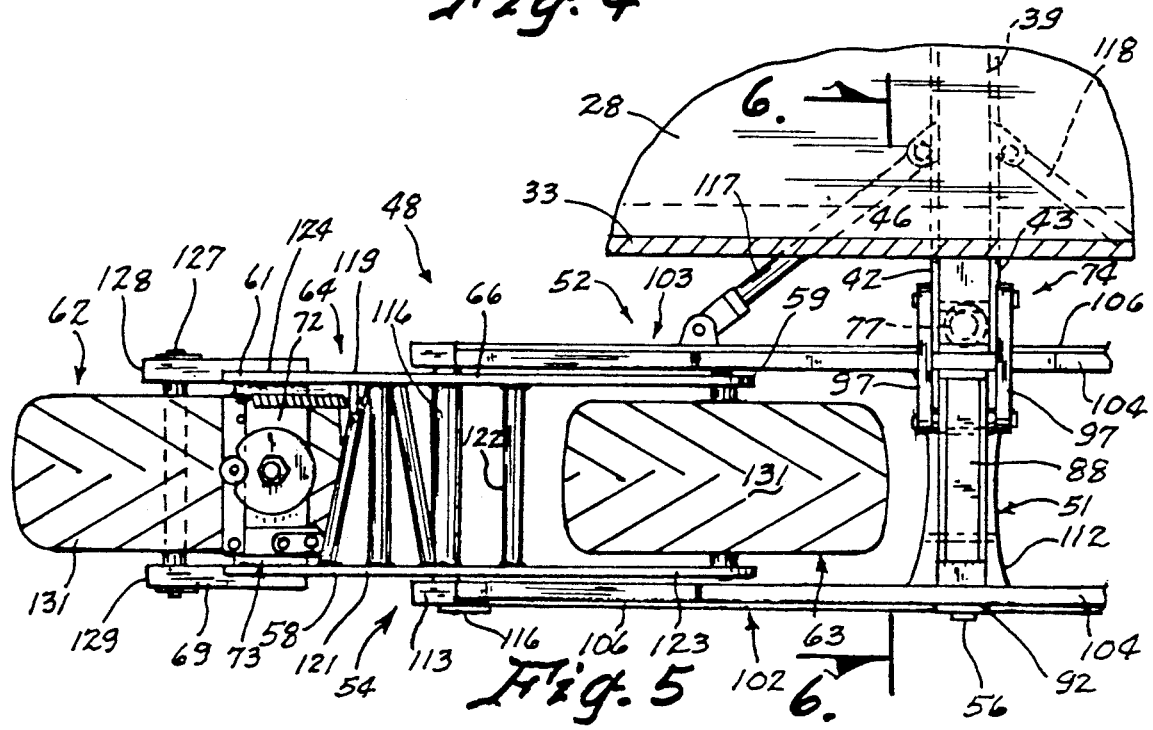
FIG. 5 is a plan view as taken along the line 5—5 in FIG. 4.
Figure 6:
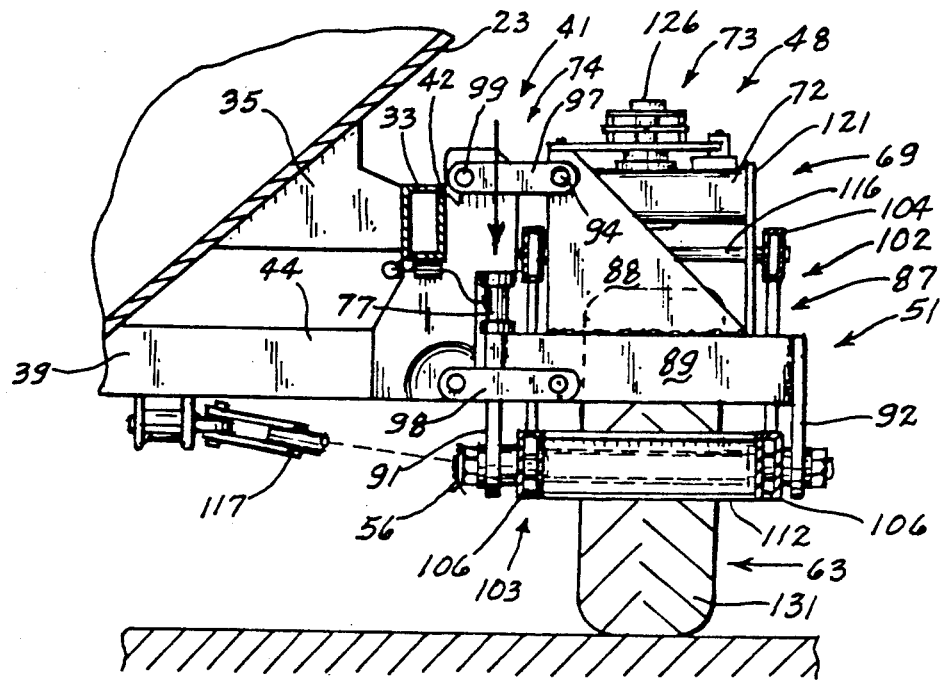
FIG. 6 is a vertical sectional view as taken along the line 6—6 in FIG. 5.
Figure 7:
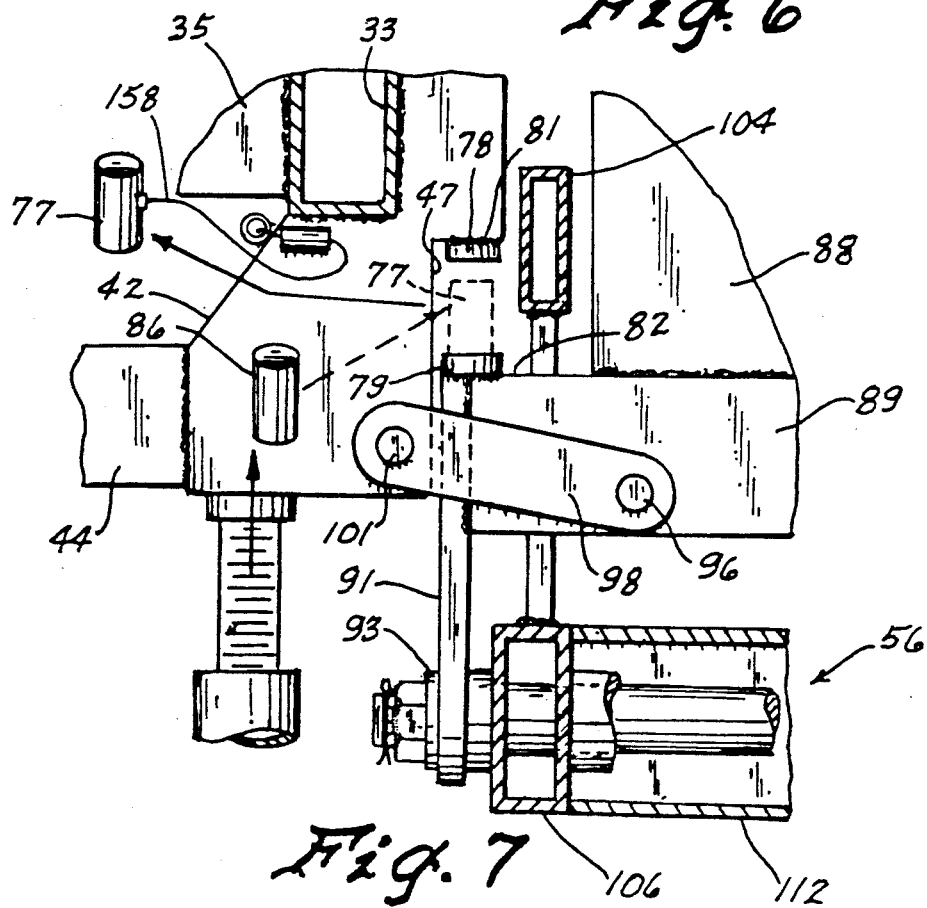
FIG. 7 is an enlarged, detail view of FIG. 6, with a load sensing device shown in full and dashed lines for clarity of illustration.

The cart (21) includes further front (26) and rear ends (27) forming a material receiving hopper (28) with the sidewalls (23), (24), the frame (22) including a pair of elongated support beams having forward, horizontally disposed portions (29), (31) diverging rearwardly from a tongue unit (32), with rearwardly and upwardly extended portions (33), (34) (FIGS. 1 and 3). The hopper (28) is supported on the forward portions (29), (31) by upstanding structure (36), part of which is shown and the rear (27) end of the hopper (28) is supported by the rearward portions (33), (34) via lateral braces (35) (FIG. 6) welded therebetween. The hopper (28) is unloaded by an auger discharge structure disclosed in U.S. Pat. No. 5,156,216, only the upper, pivotal auger extension (37) (FIG. 3) being shown herein, the extension (37) operable to extend upwardly and outwardly from a front corner of the hopper (28) while discharging material, or disposed alongside the hopper (28) when in transport position. Drive equipment for connection to a prime mover (38) PTO (not shown) and for effecting discharge operation is also not shown herein but is disclosed in said patent. The art frame (22) further includes a transverse axle (39) (FIGS. 3 and 6) at each end of which a suspension mounting assembly (41) is mounted (FIGS. 4-7). The assemblies (41) are identical and the axle (39) is located about a foot rearwardly of the centerline of the hopper (28) (see FIG. 1).

Each assembly (41) comprises an irregular box-shaped structure having side panels (42), (43) (FIGS. 6 and 7) secured as by welding to the axle outer end (44) and to the particular support beam portion (29) or (31) adjacent thereto, with a top piece (46) and further with a cutout portion (47) (FIG. 7) formed at the outer lower part of the assembly (41) for reasons hereinafter discussed.

Figure 2:
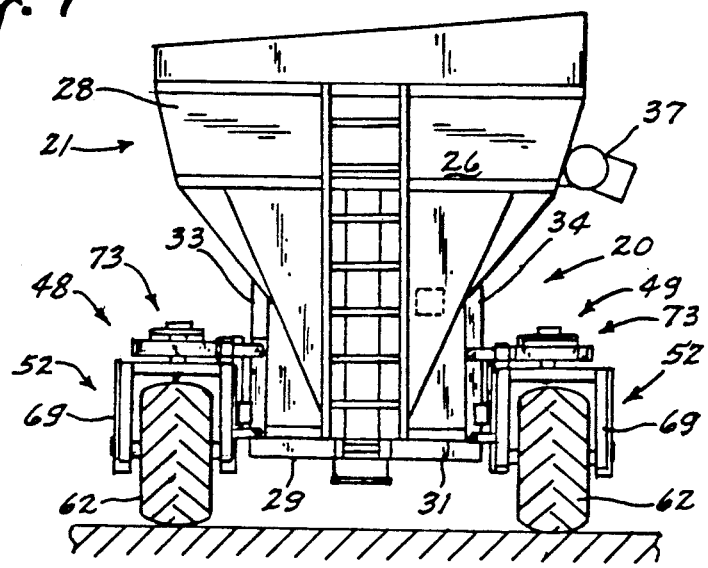
FIG. 2 is a front elevational view thereof as taken along the lines 2—2 in FIG. 1.

The suspension system (20) for supporting the cart (21) as described hereinbefore, or for supporting any such cart or vehicle adapted to receive the instant system (20) comprises a pair of identical suspension assemblies (48), (49) (FIGS. 1-3) mounted in identical manner and placement on either side of the cart (21). As the assemblies (48), (49) are identical only one will be described.

The suspension assembly (48) comprises generally an outrigger assembly (51) secured to and extended laterally from a respective frame mounting assembly (41) at one sidewall (23) of the cart (21); an axle frame assembly (52) having front (53) and rear (54) ends and being pivotally mounted by a pivot shaft unit (56) (FIGS. 6 and 7) intermediate its ends (53), (54) to the adjacent outrigger assembly (51) for pivotal movement in a vertical plane, the axle frame assembly (52) disposed longitudinally of and along an adjacent sidewall (23) (FIG. 2) of the cart (21); a front multi-wheel bogie assembly (57) (FIG. 1) including a frame weldment (58) having inner and outer ends (59), (61) respectively, each supported on and by a ground engaging wheel unit (62), (63) rotatably connected thereto, the frame weldment (58) pivotally mounted intermediate its ends (59), (61) to the front end (53) of the axle frame assembly (52); and a rear multi-wheel bogie assembly (64) (FIGS. 4 and 5) including a frame weldment (66) having inner and outer ends (67), (68) respectively, each supported on and by a ground engaging wheel unit (62), (63), rotatably connected thereto, the frame weldment (66) pivotally mounted intermediate its ends (67), (68) to the rear end (54) of the axle frame assembly (52).

The suspension system comprises further each wheel unit (62) of both bogie assemblies (57), (64), which wheel units (62) are the outer wheel units at the front and rear ends (53), (54) of the axle frame assembly (52), including a caster frame weldment (69) (FIGS. 4 and 5) having a U-shape with an upper element (71) disposed between each respective pair of bogie assembly outer ends (61), (68) interconnected by an element (72) to which the caster element (71) is pivotally connected about a vertical axis for castering purposes. A caster locking unit (73) (FIGS. 8, 9, 12, 13) is provided, mounted at each bogie assembly outer ends (61), (68) for tending to bias each bogie assembly wheel unit (62) mounted at the outer ends (61), (68) into a semi-locked position trailing or extending rearwardly of the outer ends (61), (68) relative to the direction of travel of the cart (21). Further, as an optional arrangement, a parallel linkage structure (74) (FIGS. 5-7) may be provided for pivotally connecting the outrigger assembly (51) to the adjacent side of the cart frame (22) via the mounting assembly (41) for movement in a vertical plane and about a horizontal axis. By providing for relative movement between the suspension assembly (48) and the cart frame (22), a load sensing system (76) (FIG. 10) may be installed, with a commercially available load sensor (77) (FIG. 7) inserted between pads (78), (79) mounted respectively on the underside (81) of the mounting assembly cutout portion (47), stationary at all times, and on a shelf (82) of the movable outrigger assembly (51). The sensor (77) is electrically connected in circuit with a junction box (83) (FIG. 10) and a computer (84) for conventional, visual display of the amount of the load within the hopper (28). A dummy sensor (86) (FIG. 7) may be substituted for the sensor (77) for non-use of the system (76), the mounting assembly (41) being raised sufficiently by a jack device (87) for substitution purposes; and it should be noted that the novelty of the suspension assembly (48) is not only not negated by the elimination of the parallel linkage structure (74) such that the mounting assembly (41) and outrigger assembly (51) are fixed together for non-relative movement, but is enhanced by the provision and use of the parallel linkage structure (74).

More particularly, the outrigger assembly (51) comprises a box frame weldment (87) (FIGS. 4–7) including as integral components an upper triangularly shaped section (88) for upper pivotal connection with the parallel linkage system (74), and a lower box section (89) also adapted for lower pivotal connection with the parallel linkage system (74) and including transversely spaced, depending parallel side plates (91), (92) (FIG. 6) for receiving the transversely extended pivot shaft unit (56) for pivotally mounting the axle frame assembly (52) to the outrigger assembly. Transversely aligned journals (93) are provided in the plates (91), (92) for rotatably receiving the shaft unit (56). As noted hereinbefore, the placement of the pivot shaft unit (56) places the centerline of the axle frame assembly (52) approximately twelve inches rearwardly (see FIG. 1) of the centerline of the load of the cart hopper (28) for load balancing purposes. Pivot pins (94), (96) (FIG. 6) are placed in longitudinal journals (not shown) formed in the sections (88), (89) for pivotal connection at the outer ends of pairs of parallel links (97), (98), mounted at the front and rear of the sections, the inner ends of the links (97), (98) pivotally connected by like pins (99), (101) to respective journals (not shown) secured approximately to the side panels (42), (43) of the suspension mounting assembly (41).

The axle frame assembly (52) includes a pair of parallel trapezoidal frames (102), (103) (FIGS. 1-3) each including an upper beam (104), a shorter lower beam (106), a forward beam (107), and a longer rear beam (108), all of the beams interconnected as illustrated by braces (109). The lower beam (106) is mounted in a normally horizontal position, with transverse journals (93) provided at the midpoints of the beams (106) for receiving the pivot shaft unit (56) interconnecting the axle frame assembly (52) with the outrigger assembly via a housing (112) interconnecting the frames (102), (103) as securing the midpoints of the lower beams (106). With each forward and rear beam (107), (108) secured to and extended upwardly at an approximately 45° angle from the lower beam (106), the longer upper beam (104) is disposed slightly upwardly toward its rear (FIG. 1). This places the upper end (113) of each rear beam (108) approximately six inches further from the centerline of the axle frame assembly (52) as determined by the pivot shaft unit (56) than the upper end (114) (FIG. 1) of the forward beam (107), and this places journals (not shown) formed therein for receiving transverse, bogie connecting pivot shafts (116) in like relationship. The axle frame assembly (52) is stabilized in its position parallel the longitudinal axis of the cart (21) and along one side thereof by a pair of stabilizer units (117), (118) (FIGS. 5 and 6) connected fore and aft of the inner side of the lower beam (106) and the main axle (39). Each stabilizer unit (117), (118) is longitudinally adjustable as to length.

The rear bogie assembly (64) (FIGS. 4 and 5) frame weldment (66) comprises a pair of identical, parallel elongated flat members (119), (121) interconnected by a plurality of tubular braces (122) and having an arcuate form in side elevation to form lower portions (123) and upper, generally horizontal portions (124). With the box element (72) (FIG. 6), the upper portions (124) form the outer end (68) of the rear bogie assembly (64) upon which is mounted the caster frame weldment (69) and wheel unit (62), and the lower portions (123) are mounted on the other wheel unit (67), forming the inner end (67). Within transverse journals and bushings (not shown) formed intermediate the ends (67), (68), the pivot shaft (116) is inserted and retained, thus pivotally connecting the rear bogie assembly (64) to the outer, upper ends (113) of the axle frame assembly (52). Vertically aligned journals with appropriate caster bearings and races (115) (FIG. 9) mounted at midpoint of the bogie box element (72) (FIG. 4) and the caster frame upper element (71) receive a vertical caster spindle (126) retained therein for providing a full 360° rotational movement of the weldment (69) and wheel unit (62) secured thereto as by a wheel spindle (127) to the depending legs (128), (129) of the weldment (69). The wheel units (62), (63) are conventional, the tires (131) having a 16.1" rim diameter and a 21⅛" width.

The front bogie assembly (57) (FIG. 1) is identical with the rear bogie assembly (64) including the caster frame weldment (69) mounting and unit; however it will again be noted that the placement of the transverse pivot shaft (116) for pivotally mounting the front bogie assembly (57) on the front end (53) of the axle frame assembly (52) is more close to the ends of the lower portions (123) (see FIG. 1) than that placement for the rear bogie assembly (64) to move the front bogie assembly pivotal mounting approximately six inches closer to the pivotal centerline (132) of he axle frame assembly (52). This arrangement has been found to aid in balancing the load of the hopper (28) on the suspension system (20) when the cart (21) is backed up. Referring to FIG. 1, it will also be noted that when in the forward direction of travel, the axis of rotation of the front wheel unit (63) of the front bogie assembly (57) is disposed approximately 30" forward of the axle frame assembly pivotal centerline (132) while the axis of rotation of the rear bogie assembly (64) is disposed approximately 32" rearwardly of the pivotal centerline (132) so as to carry slightly more of the load weight on the front bogie assembly (57).

The caster locking unit (73) (FIGS. 8, 9, 12 and 13) comprises a circular plate (133) having a notch (134) formed in an edge thereof, and engageable in a nested manner with a roller (136) secured between a keeper plate (137) and a lock arm (138) by a vertical shaft (139). One end (141) of the arm (138) is journaled for swingable connection to an upright spindle (142) on an adjuster plate (143), the plate (143) pivotal at its midpoint to an upright spindle (144) secured to the bogie connecting element (72) and swingably adjustable by a pair of Allen-type screws (146), (147) engageable on opposite sides through legs (148), (149) of the plate (143) with another spindle (151) also secured to the element (72) as best illustrated in FIGS. 12 and 13. A doubler (152) is affixed to the spindles (144), (151) for locking down the adjuster plate (143). The end (153) of the lock arm (138) is connected by a coil spring (154) to a projection (156) on an adjacent bogie member upper portion (124) (FIG. 8).

By this arrangement, both the front and rear bogie assembly caster frames (69) are mounted such that their respective circular plates (133) releasably lock the caster frames (69) with their outer bogie wheel units (62) in trailing relationship relative to the forward direction of travel of the grain cart (21). Upon a reversal or rearward backing movement of the cart (21), or upon the cart (21) being pulled about a sharp corner, the tendency of the outer wheel unit (62) to caster will force the plate (133) out from its engagement with the roller (136), enabling each bogie assembly (57), (64) to rotate to accommodate the new direction of travel until a forward direction again causes a re-nesting of the plate (133) and roller (136) to bias the bogie assemblies (57), (64) into their normal, longitudinally aligned positions alongside the cart (21) and parallel the direction of cart movement.

The load sensing system (76) comprises a pair of sensors (77), one for each suspension assembly (48), (49) as described hereinbefore, and a third sensor (157) (FIG. 11) may be inserted in the tongue unit (32), all sensors deformable and functioning as transducers and electrically connected by leads (158) to the junction box (83) and by another lead (159) to the computer (84) placed, for example, in the cab (not shown) of the prime mover (38) for visual display of the load within the cart hopper (28). In one example of the hopper (28) carrying approximately 1000 bushels or 30,000 pounds of corn, the deformation of each sensor (77) was 0.0003".

It can therefore be seen that the present grain cart with its four wheels on a side provides an extremely light load on each wheel, thus decreasing soil compaction as compared to contemporary cart suspension systems, and with the independently mounted four wheels on a side pivoting about three independent pivot points, a smooth level moving action of the cart over uneven terrain is obtained to obviate spilled grains. For these reasons, the novel suspension system disclosed and described herein has been given the apt trade name Lightfoot.

We claim:

1. A suspension system for a heavy duty cart having a frame with opposed sides, comprising: in combination:
    an outrigger assembly secured to and extended laterally from each side of the frame;
    an axle frame assembly having front and rear ends and pivotally mounted intermediate its ends to each said outrigger assembly, each axle frame assembly disposed longitudinally of and along each side of the cart;
    a front bogie assembly including a frame weldment having inner and outer ends, each said end supported by a ground engaging wheel unit rotatably connected thereto, said front bogie assembly pivotally mounted intermediate its said ends to said front end of each said axle frame assembly; and
    a rear bogie assembly including a frame weldment having inner and outer ends, each said rear bogie assembly ends supported by a ground engaging wheel unit rotatably connected thereto, said rear bogie assembly pivotally mounted intermediate its said ends to said rear end of each said axle frame assembly.

2. The invention of claim 1 and further wherein said outrigger assembly is mounted centrally of the frame and includes a pair of transversely spaced side plates disposed on either side of said axle frame assembly for pivotal mounting of said axle frame assembly to said outrigger assembly in transverse alignment with said central mounting.

3. The invention of claim 2 and further wherein the pivotal mounting of said axle frame assembly is about a transverse, normally horizontal axis whereby said axle frame assembly may pivot in a normally vertical plane.

4. The invention of claim 3 and further wherein said axle frame assembly comprises a pair of trapezoidal frame units and including further pivot shaft means transversely interconnecting said frame units with said outrigger assembly side plates.

5. The invention of claim 4 and further wherein each said front and rear bogie assembly includes a pair of elongated members transversely interconnected in an H arrangement with outer ends and inner ends, a brace member interconnecting said outer ends.

6. The invention of claim 5, and further wherein said each bogie assembly is pivotally movable between a respective pair of trapezoidal frame units within a normally vertical plane.

7. The invention of claim 6, and wherein each pair of front and rear bogie assembly outer ends extend longitudinally outwardly of said respective outrigger assembly.

8. The invention of claim 1, each bogie assembly including further a caster frame weldment having a U-shape with an upper element disposed between each respective pair of bogie assembly outer ends and pivotally connected thereto for rotatable caster movement about a normally vertical axis.

9. The invention of claim 8, and further wherein said upper element is disposed below said brace member, and a spindle unit is rotatably connected said upper element and said brace member.

10. The invention of claim 9, and caster locking means for biasing each said outer ends wheel unit into a position trailing each said outer ends relative to the direction of movement of the cart.

11. The invention of claim 1, and means pivotally connecting each said outrigger assembly to each side of the cart frame for movement in a vertical plane and about a horizontal axis disposed parallel the longitudinal axis of the cart, load sensing means mounted on each outrigger assembly for engagement by the cart frame in response to receipt of particulate material within the cart, said load sensing means electrically connected with a computer for visually displaying the particulate material weight.

* * * * *